United States Patent
Murakoshi

(10) Patent No.: US 12,010,719 B2
(45) Date of Patent: Jun. 11, 2024

(54) MOVING BODY, COMMUNICATION METHOD, AND PROGRAM

(71) Applicant: Sony Group Corporation, Tokyo (JP)

(72) Inventor: Sho Murakoshi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 426 days.

(21) Appl. No.: 17/428,287

(22) PCT Filed: Jan. 30, 2020

(86) PCT No.: PCT/JP2020/003341
§ 371 (c)(1),
(2) Date: Aug. 4, 2021

(87) PCT Pub. No.: WO2020/166348
PCT Pub. Date: Aug. 20, 2020

(65) Prior Publication Data
US 2022/0141845 A1 May 5, 2022

(30) Foreign Application Priority Data
Feb. 13, 2019 (JP) .................................. 2019-023215

(51) Int. Cl.
*H04W 72/12* (2023.01)
*B64C 39/02* (2023.01)
(Continued)

(52) U.S. Cl.
CPC ......... *H04W 72/569* (2023.01); *B64C 39/024* (2013.01); *B64D 47/08* (2013.01);
(Continued)

(58) Field of Classification Search
CPC . H04W 72/569; H04W 4/40; H04W 28/0226; H04W 4/025; H04W 4/70;
(Continued)

(56) References Cited

U.S. PATENT DOCUMENTS 10,244,547 B2 * 3/2019 Nagura ............... H04W 52/146
10,291,319 B1 * 5/2019 Karplus ............... G01S 7/4817
(Continued)

FOREIGN PATENT DOCUMENTS

CN      1930865 A     3/2007
CN      105556941 A   5/2016
(Continued)

OTHER PUBLICATIONS

International Search Report and Written Opinion dated Apr. 21, 2020, received for PCT Application PCT/JP2020/003341, Filed on Jan. 30, 2020, 9 pages including English Translation.

*Primary Examiner* — Wutchung Chu
(74) *Attorney, Agent, or Firm* — XSENSUS LLP

(57) ABSTRACT

The present disclosure relates to a moving body, a communication method, and a program that enable preferential transmission of required data.
A control unit sets a processing priority for data acquired by its own machine, and a communication unit transmits the data on the basis of the set priority. Technology according to the present disclosure can be applied to, for example, a moving body such as a drone.

13 Claims, 14 Drawing Sheets

(51) Int. Cl.
    *B64D 47/08*     (2006.01)
    *G06T 7/70*     (2017.01)
    *G06V 20/10*     (2022.01)
    *G06V 20/17*     (2022.01)
    *H04W 4/40*     (2018.01)
    *H04W 28/02*     (2009.01)
    *H04W 72/566*     (2023.01)
    *B64U 101/30*     (2023.01)

(52) U.S. Cl.
    CPC ............... *G06T 7/70* (2017.01); *G06V 20/17* (2022.01); *G06V 20/176* (2022.01); *H04W 4/40* (2018.02); *H04W 28/0226* (2013.01); *B64U 2101/30* (2023.01); *B64U 2201/104* (2023.01); *G06T 2207/10032* (2013.01); *G06T 2207/30184* (2013.01)

(58) Field of Classification Search
    CPC ..... H04W 28/02; B64C 39/024; B64D 47/08; G06T 7/70; G06T 2207/10032; G06T 2207/30184; G06T 1/0007; G06V 20/17; G06V 20/176; B64U 2101/30; B64U 2201/104; H04N 7/183
    See application file for complete search history.

(56) References Cited

U.S. PATENT DOCUMENTS

| | | | |
|---|---|---|---|
| 10,810,806 B2* | 10/2020 | Petousis | H04W 4/44 |
| 11,032,681 B2* | 6/2021 | Hitotsumatsu | H04W 4/44 |
| 11,167,846 B2* | 11/2021 | Nakagawa | H04N 7/183 |
| 2014/0087730 A1 | 3/2014 | Shitara | |
| 2015/0120336 A1* | 4/2015 | Grokop | H04R 3/002 705/4 |
| 2017/0180623 A1* | 6/2017 | Lin | G03B 15/006 |
| 2018/0240249 A1* | 8/2018 | Uchigaito | G06V 40/10 |
| 2018/0295634 A1* | 10/2018 | Nagura | H04W 4/24 |
| 2018/0330539 A1* | 11/2018 | Katagiri | G08G 1/166 |
| 2018/0350236 A1* | 12/2018 | Yamaguchi | G08G 1/09626 |
| 2019/0039605 A1* | 2/2019 | Iio | B62D 15/0285 |
| 2019/0206014 A1* | 7/2019 | Furukawa | G06T 15/00 |
| 2019/0228558 A1* | 7/2019 | Kobayashi | H04N 13/243 |
| 2019/0239155 A1* | 8/2019 | Ushida | G08G 1/09 |
| 2019/0320113 A1* | 10/2019 | Rajvanshi | H04N 23/64 |
| 2020/0051437 A1* | 2/2020 | Sakito | G08G 1/056 |
| 2020/0064142 A1* | 2/2020 | Choi | G06T 19/006 |
| 2020/0210725 A1* | 7/2020 | Suzuki | G08G 1/09 |
| 2020/0286183 A1* | 9/2020 | Furukawa | G08G 1/00 |
| 2020/0379487 A1* | 12/2020 | Iwase | G08G 5/0026 |
| 2021/0049914 A1* | 2/2021 | Dalan | G06V 20/13 |
| 2021/0173400 A1* | 6/2021 | Hasegawa | G05D 1/0297 |
| 2021/0327265 A1* | 10/2021 | Schulte | H04W 4/44 |
| 2022/0141441 A1* | 5/2022 | Kaneko | G06F 3/04855 348/42 |

FOREIGN PATENT DOCUMENTS

| | | |
|---|---|---|
| CN | 105960810 A | 9/2016 |
| JP | 2003-252152 A | 9/2003 |
| JP | 2010-252073 A | 11/2010 |
| JP | 2017-503385 A | 1/2017 |
| JP | 2017016359 A | 1/2017 |
| JP | 2017033403 A | 2/2017 |
| JP | 2018-182430 A | 11/2018 |
| WO | 2009/139111 A1 | 11/2009 |
| WO | 2018/143398 A1 | 8/2018 |

* cited by examiner

FIG. 8

| PRIORITY | |
|---|---|
| HIGH | CAPTURED IMAGE CAPTURED NEAR AIR PHOTO SIGNAL |
| LOW | OTHER CAPTURED IMAGE |

FIG. 9

| PRIORITY | AMOUNT OF DATA SMALL | AMOUNT OF DATA LARGE |
|---|---|---|
| HIGH | IDENTIFIER IN WHICH POSITION OF GPS INFORMATION ASSOCIATED WITH IDENTIFIER OF CAPTURED IMAGE IS NEAR AIR PHOTO SIGNAL | CAPTURED IMAGE IN WHICH POSITION OF GPS INFORMATION STORED IN Exif IS NEAR AIR PHOTO SIGNAL |
| LOW | IDENTIFIER IN WHICH POSITION OF GPS INFORMATION ASSOCIATED WITH IDENTIFIER OF CAPTURED IMAGE IS FAR FROM AIR PHOTO SIGNAL | CAPTURED IMAGE IN WHICH POSITION OF GPS INFORMATION STORED IN Exif IS FAR FROM AIR PHOTO SIGNAL |

FIG. 12

| PRIORITY | AMOUNT OF DATA SMALL | AMOUNT OF DATA MEDIUM | AMOUNT OF DATA LARGE |
|---|---|---|---|
| HIGH | ANALYSIS RESULT (IDENTIFIER OF CAPTURED IMAGE, POSITION INFORMATION OF AIR PHOTO SIGNAL) | | |
| MEDIUM | | IMAGE OBTAINED BY CUTTING OUT AREA INCLUDING AIR PHOTO SIGNAL FROM CAPTURED IMAGE WITH AIR PHOTO SIGNAL | CAPTURED IMAGE WITH AIR PHOTO SIGNAL |
| LOW | | | CAPTURED IMAGE WITHOUT AIR PHOTO SIGNAL |

FIG. 13

| IDENTIFICATION TARGET | ANALYSIS RESULT |
|---|---|
| AIR PHOTO SIGNAL | POSITION INFORMATION OF AIR PHOTO SIGNAL |
| CRACK/TILE PEELING ON OUTER WALL | DETECTION INFORMATION OF CRACKED/TILE PEELED PORTION |
| DAMAGE TO SOLAR PANEL | DETECTION INFORMATION OF DAMAGED PORTION |

MOVING BODY, COMMUNICATION METHOD, AND PROGRAM

CROSS-REFERENCE TO RELATED APPLICATIONS

The present application is based on PCT filing PCT/JP2020/003341, filed Jan. 30, 2020, which claims priority to JP 2019-023215, filed Feb. 13, 2019, the entire contents of each are incorporated herein by reference.

TECHNICAL FIELD

The present disclosure relates to a moving body, a communication method, and a program, and in particular to a moving body, a communication method, and a program that enable preferential transmission of required data.

BACKGROUND ART

Conventionally, communication between a moving body moving autonomously and a controller or a server has been performed uniformly regardless of a type of data. In addition to autonomous moving robots such as a drone, a vehicle, a vessel, and a vacuum cleaner that move autonomously, the moving body includes a device or the like that is attached to the moving body and moves. Therefore, movement of the moving body includes movement by flight, movement on land or on water (or underwater), indoor movement, and the like.

Among them, Patent Document 1 describes that a ground terminal transmits flight control data with a higher priority than image data transmitted by an unmanned aerial vehicle (UAV).

CITATION LIST

Patent Document

Patent Document 1: Japanese Translation of PCT Publication No. 2017-503385

SUMMARY OF THE INVENTION

Problems to be Solved by the Invention

When a moving body transmits data during movement, for example, it is required to set a priority of the data to be transmitted and to determine transmission depending on whether or not the movement is successful. Whether or not the movement is successful is determined, for example, by whether or not the movement has been performed along a predetermined route, or by contents of imaged image data. Furthermore, in order to quickly determine whether or not it is necessary to image again the image data that has already been imaged, it is necessary to preferentially transmit image data required for the determination.

The present disclosure has been made in view of such a situation, and is intended to enable preferential transmission of necessary data.

Solutions to Problems

A moving body of the present disclosure is an unmanned aerial vehicle including: a control unit that sets a processing priority for data acquired by its own machine; and a communication unit that transmits the data on the basis of the set priority.

A communication method of the present disclosure is a communication method in which a moving body sets a processing priority for data acquired by its own machine, and transmits the data on the basis of the set priority.

A program of the present disclosure is a program for allowing a computer to execute processing of: setting a processing priority for data acquired by a moving body; and transmitting the data on the basis of the set priority.

In the present disclosure, the processing priority is set for the data acquired by the moving body, and the data is transmitted on the basis of the set priority.

BRIEF DESCRIPTION OF DRAWINGS

FIG. 8 is a diagram illustrating a priority.

FIG. 9 is a diagram illustrating a priority.

FIG. 12 is a diagram illustrating a transmission priority.

FIG. 13 is a diagram illustrating an example of an identification target and an analysis result for each flight purpose.

MODE FOR CARRYING OUT THE INVENTION

Figure 1:
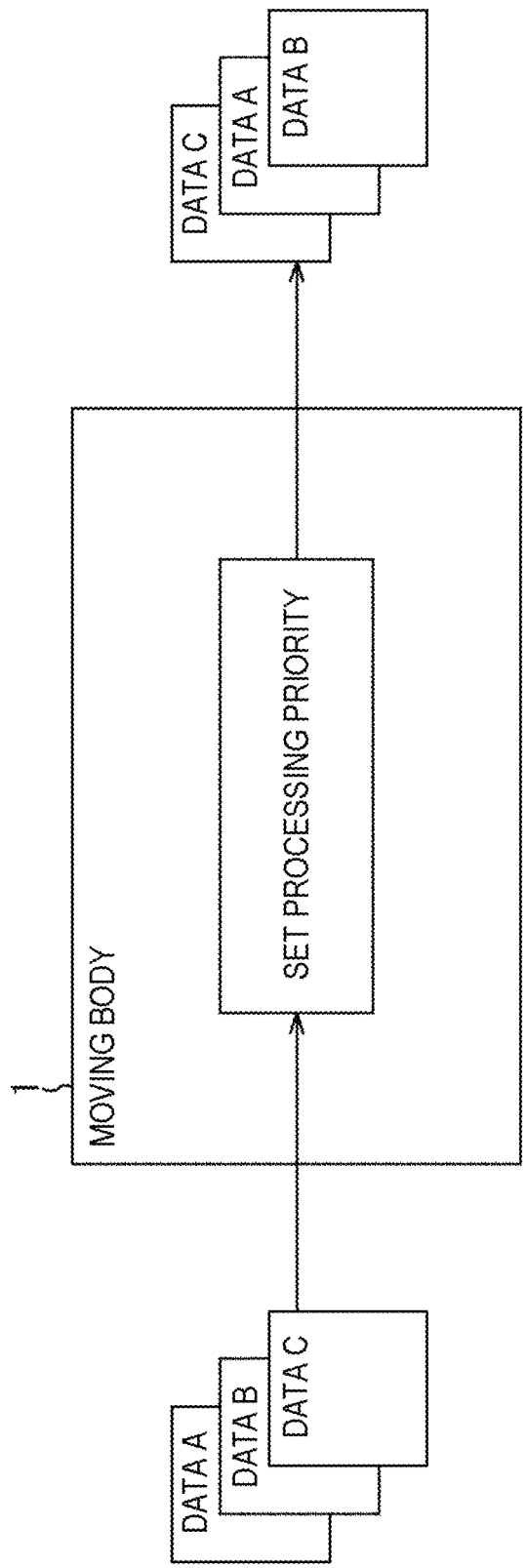
FIG. 1 is a diagram illustrating a moving body to which technology according to the present disclosure is applied.

Hereinafter, an embodiment for carrying out the present disclosure (hereinafter referred to as an embodiment) will be described. Note that the description will be given in the following order.

1. Moving body to which technology according to the present disclosure is applied
2. Overview of surveying/inspection system
3. Configurations of moving body and cloud server
4. Flow of data transmission processing
5. Example of analyzing captured image
6. Example of identification target and analysis result for each flight purpose
7. Operation of cloud server
8. Others <1. Moving Body to which Technology According to the Present Disclosure is Applied>

As shown in FIG. 1, a moving body 1 to which technology according to the present disclosure is applied is configured to set a processing priority for data acquired by its own machine and to transmit the data on the basis of the set priority. In FIG. 1, processing priorities are set for data A, B, and C, and the data A, B, and C are transmitted at the set priorities.

In addition to autonomous moving robots such as a drone, a vehicle, a vessel, and a vacuum cleaner that move autonomously, the moving body includes a device or the like that is attached to the moving body and moves. In the following, an example in which the technology according to the present disclosure is applied to a drone flying in the air will be described. However, in addition to the drone, the technology according to the present disclosure can be applied to autonomous moving robots such as an autonomous traveling vehicle moving on land, an autonomous navigation vessel moving on or under water, and an autonomous moving vacuum cleaner moving indoors.

<2. Overview of Surveying/Inspection System>

Figure 2:
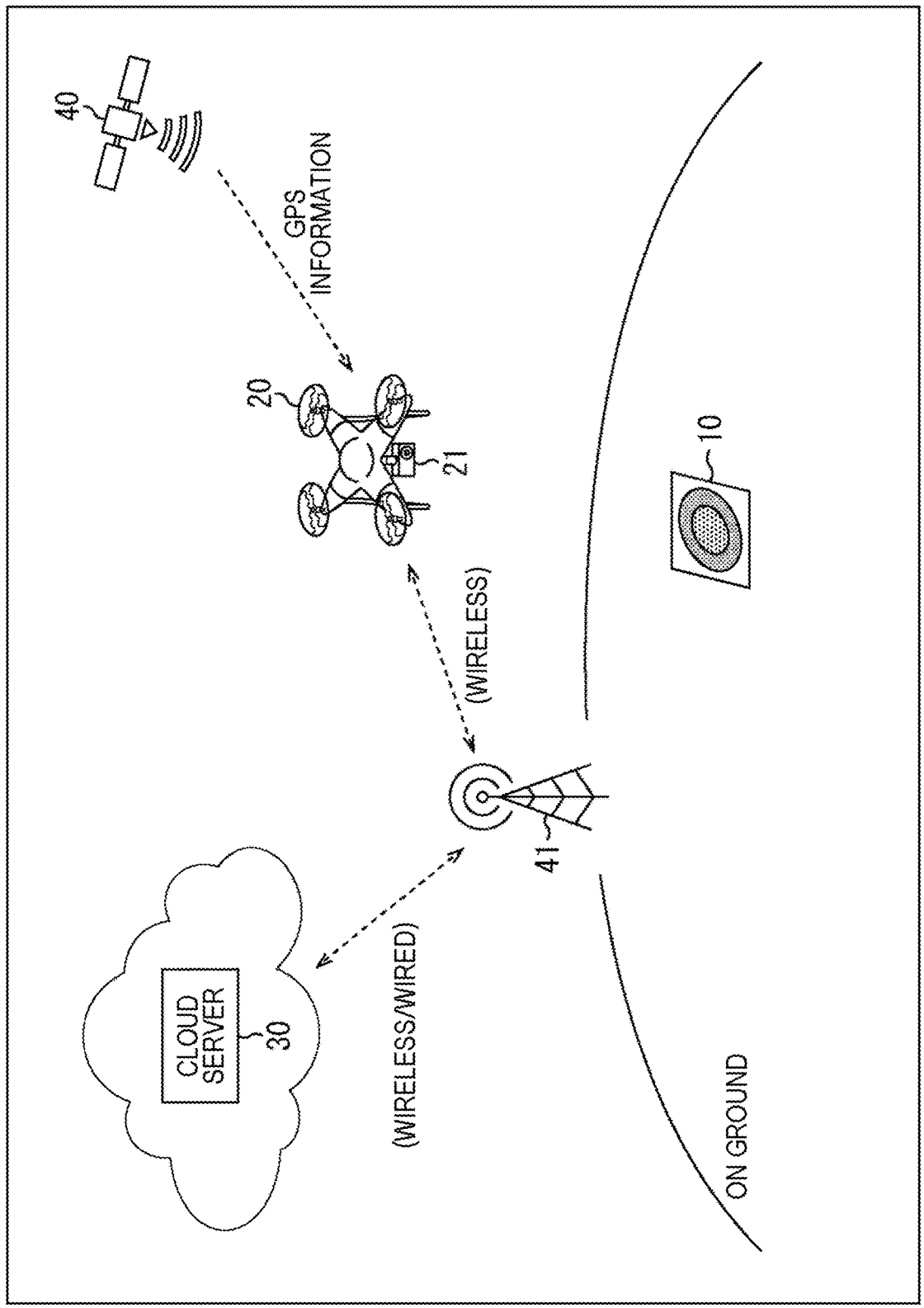
FIG. 2 is a diagram for illustrating an overview of a surveying/inspection system.

FIG. 2 is a diagram illustrating an overview of a surveying/inspection system including the moving body to which the technology according to the present disclosure (the present technology) is applied.

In the surveying/inspection system shown in FIG. 2, an unmanned aerial vehicle (UAV) is used to survey topography and inspect a structure.

As shown in FIG. 2, an air photo signal 10 is installed on the ground as an example of a target signal placed at a preset position on a movement route of the moving body to which the present technology is applied. The target signal includes a traffic sign, a geofence sign, a building, a person, and the like in addition to the air photo signal 10. The air photo signal 10 is installed manually, or is installed by scattering it from an unmanned aerial vehicle such as a drone or an aircraft controlled by a person. Furthermore, the air photo signal 10 itself may be moved by installing the air photo signal 10 on a top surface of the drone.

Note that although not shown, a plurality of air photo signals 10 is installed on the ground when the topography is surveyed.

The air photo signal 10 may include paper or plastic on which a predetermined figure is printed, or may be configured by stacking flat materials such as plastic or rubber having a predetermined shape. Furthermore, the air photo signal 10 may include a display panel such as a liquid crystal display (LCD) or an organic electro luminescence (EL) display for displaying a predetermined figure, or may have an expanded and developed structure such as a reflector.

The air photo signal 10 is subjected to aerial imaging. In the surveying/inspection system of FIG. 2, a camera 21 is mounted on a moving body 20 configured as a drone. The moving body 20 is moved, and imaging of the air photo signal 10 (aerial imaging of the air photo signal 10) is performed by the camera 21 mounted on the moving body 20. In this example, the movement of the moving body 20 is a movement by flight. However, it is a movement on land in a case where the moving body 20 is configured as an autonomous traveling vehicle, and it is a movement on or under water in a case where the moving body 20 is configured as an autonomous navigation vessel. Furthermore, it is an indoor movement in a case where the moving body 20 is configured as an autonomous moving vacuum cleaner.

An aerial imaging method of the air photo signal 10 is not limited to the method using the moving body 20. In other words, the aerial imaging of the air photo signal 10 may be performed not only by using an unmanned aerial vehicle such as the moving body 20, but also by using, for example, a flight vehicle boarded and controlled by a person, an artificial satellite, or the like.

By receiving global positioning system (GPS) information transmitted from a GPS satellite 40, the moving body 20 acquires position information representing latitude and longitude of its own machine (a position of its own machine).

Furthermore, the moving body 20 transmits a captured image (for example, a still image) acquired by imaging the air photo signal 10 with the camera 21 to a cloud server 30 via a base station 41 installed on the ground by wireless communication or wired communication.

Figure 3:
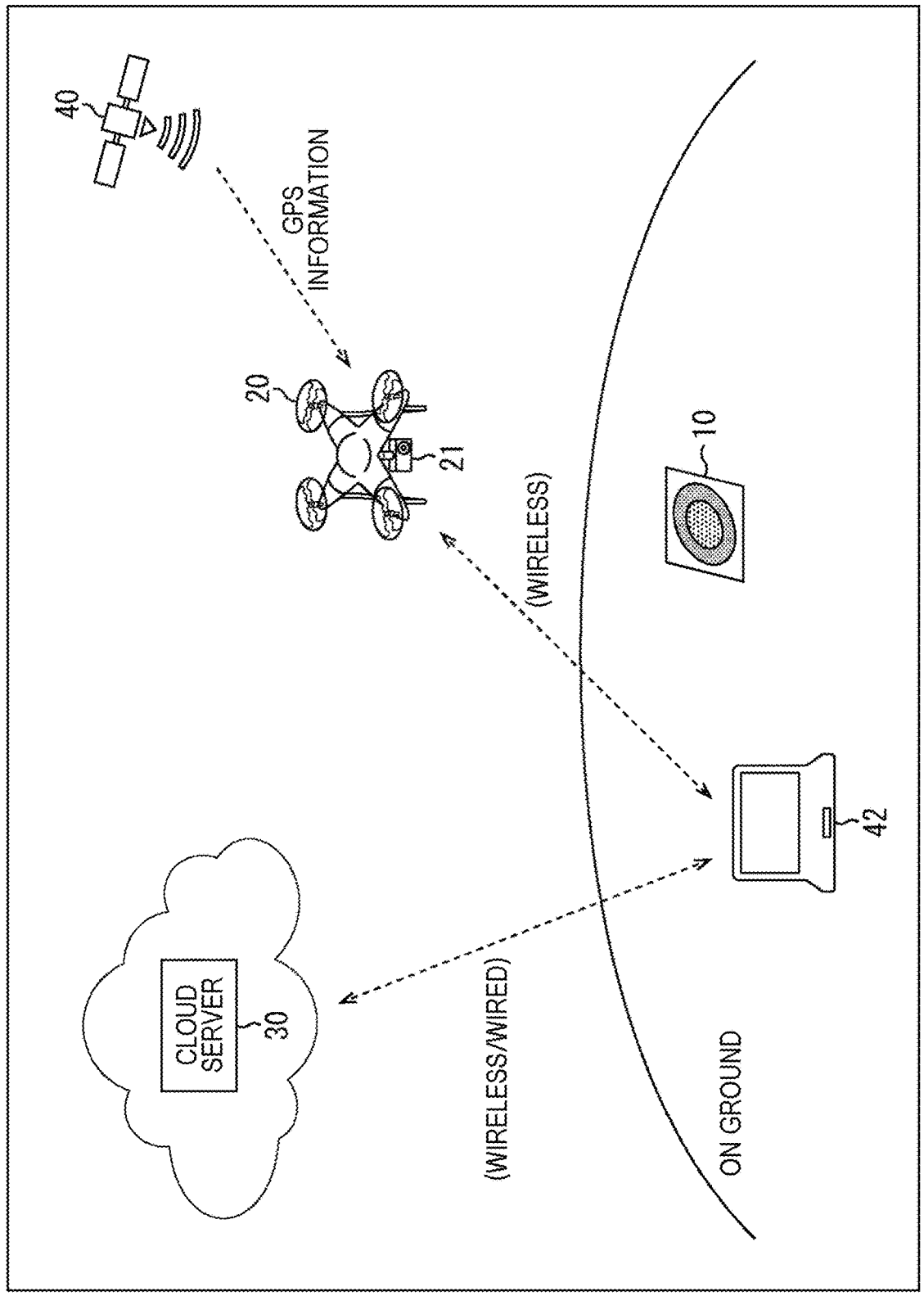
FIG. 3 is a diagram for illustrating an overview of a surveying/inspection system.

Note that, as shown in FIG. 3, the moving body 20 can transmit the captured image to the cloud server 30 via a controller 42 for controlling the moving body 20 having a transmitter, a personal computer (PC), and the like. Furthermore, the moving body 20 may directly transmit the captured image to the cloud server 30.

The cloud server 30 identifies the air photo signal 10 appearing in the captured image by analyzing the captured image from the camera 21. Furthermore, the cloud server 30 creates a three-dimensional model of topography on the ground using an analysis result of the air photo signal 10. Then, the cloud server 30 surveys the topography on the ground from the created three-dimensional model and outputs a result of the survey.

Processing performed by the cloud server 30 may be performed by the moving body 20 instead of the cloud server 30, or may be shared between the moving body 20 and the cloud server 30.

By the way, in the above-mentioned surveying/inspection system, when the cloud server 30 analyzes the captured image from the camera 21, the captured image without the air photo signal 10 is not required.

Therefore, in order for the cloud server 30 to output the topographical survey result faster, it is necessary for the moving body 20 to preferentially transmit the captured image with the air photo signal 10 during the flight.

Therefore, in the surveying/inspection system of FIG. 2, the moving body 20 sets a processing priority for the captured image acquired by its own machine, so that the captured image with the air photo signal 10 is transmitted preferentially. Therefore, even in a case where a communication band between the moving body 20 and the cloud server 30 is narrow, the topographical survey result can be output with less delay.

<3. Configurations of Moving Body and Cloud Server>

In the following, configurations of the moving body 20 and the cloud server 30 constituting the above-mentioned surveying/inspection system will be described.

(Configuration of Moving Body)

Figure 4:
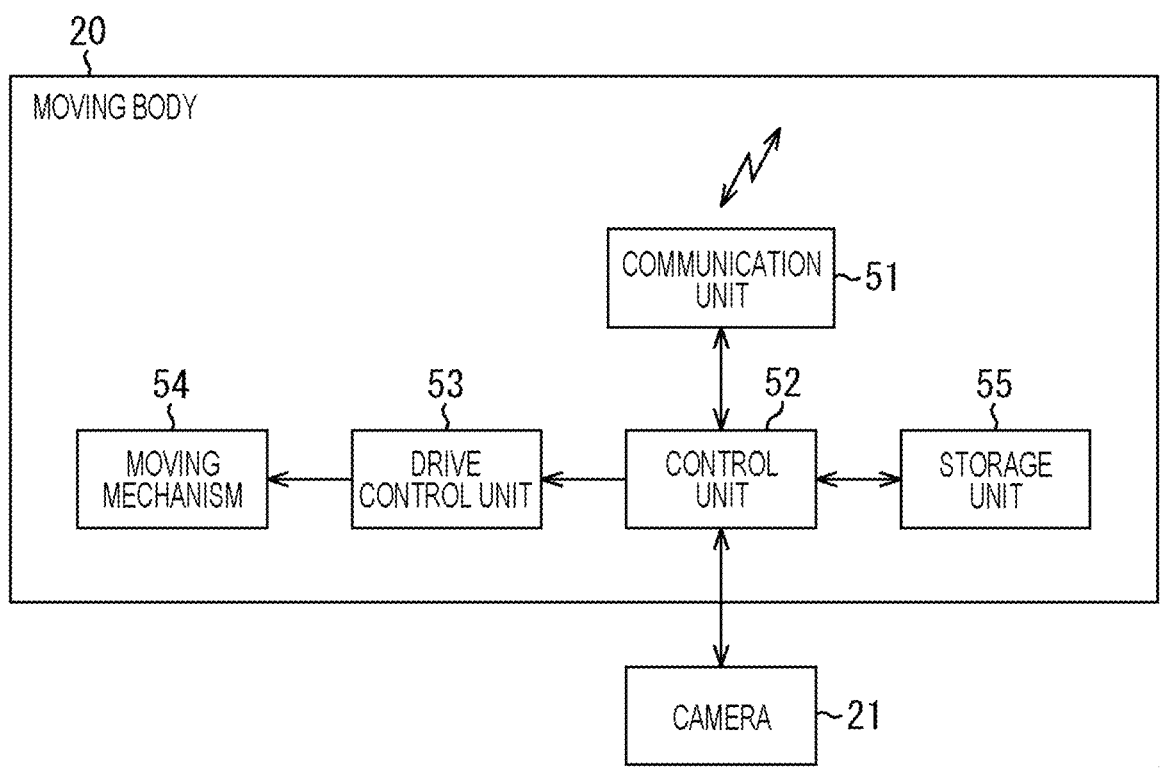
FIG. 4 is a block diagram showing a configuration example of a moving body.

FIG. 4 is a block diagram showing a configuration example of the moving body 20.

The moving body 20 includes a communication unit 51, a control unit 52, a drive control unit 53, a moving mechanism 54, and a storage unit 55.

The communication unit 51 includes a network interface or the like, and performs wireless or wired communication with the cloud server 30, the controller 42 for controlling the moving body 20 (FIG. 3), and any other device. For example, the communication unit 51 may directly communicate with a device to be communicated with, or may perform network communication via a base station or a repeater for Wi-Fi (registered trademark), 4G, 5G, or the like. Furthermore, the communication unit 51 acquires a position of its own machine by receiving GPS information transmitted from the GPS satellite 40.

The control unit 52 includes a central processing unit (CPU), a memory, and the like, and controls the communication unit 51, the drive control unit 53, the storage unit 55, and the camera 21 by executing a predetermined program.

The drive control unit 53 includes a circuit such as a dedicated IC and a field-programmable gate array (FPGA), and controls drive of the moving mechanism 54 according to control of the control unit 52.

The moving mechanism 54 is a mechanism for moving the moving body 20, and includes a flight mechanism, a traveling mechanism, a propulsion mechanism, and the like. In this example, the moving body 20 is configured as a drone, and the moving mechanism 54 includes a motor, a propeller, and the like as a flight mechanism. Furthermore, in a case where the moving body 20 is configured as an autonomous traveling vehicle, the moving mechanism 54 includes wheels or the like as a traveling mechanism. In a case where the moving body 20 is configured as an autonomous navigation vessel, the moving mechanism 54 includes a screw propeller and the like as a propulsion mechanism. The moving mechanism 54 is driven according to control of the drive control unit 53 to move the moving body 20.

In the moving body 20, the control unit 52 drives the moving mechanism 54 by controlling the drive control unit 53 according to, for example, a signal from the controller 42 received by the communication unit 51. Therefore, the moving body 20 moves according to operation of the controller 42.

Furthermore, the control unit 52 controls the camera 21 according to the signal from the controller 42 to perform imaging.

The storage unit 55 includes a non-volatile memory such as a flash memory, and stores various types of information according to control of the control unit 52. For example, the storage unit 55 stores (houses) a specific position preset on a movement route as context information regarding a movement route. The specific position is, for example, an installation position where the air photo signal 10 as the target signal is installed.

The control unit 52 sets a processing priority for data acquired by its own machine. Specifically, the control unit 52 sets a priority of transmission for data to be transmitted to the cloud server 30 (hereinafter, also referred to as transmission data), and sets a priority of data analysis. For example, the control unit 52 sets a priority for transmission data including a captured image on the basis of the position of its own machine when the captured image has been acquired by the imaging of the camera 21 and the context information (specific position) stored in the storage unit 55.

Then, the communication unit 51 transmits the transmission data to the cloud server 30 on the basis of the priority set by the control unit 52.

(Configuration of Cloud Server)

Figure 5:
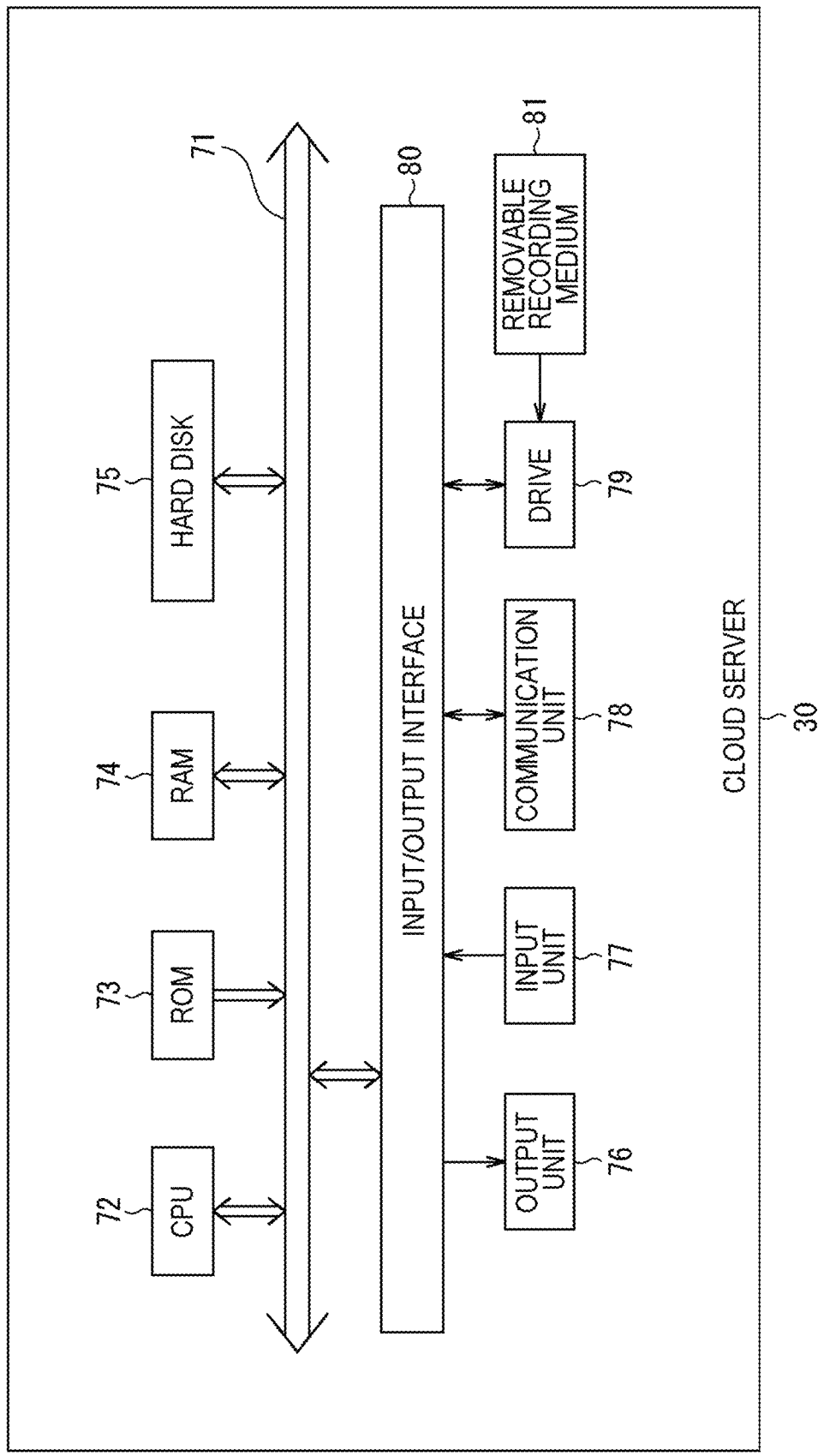
FIG. 5 is a block diagram showing a hardware configuration example of a cloud server.

FIG. 5 is a block diagram showing a configuration example of hardware of the cloud server 30.

The cloud server 30 has a built-in CPU 72, and an input/output interface 80 is connected to the CPU 72 via s bus 71.

When a command is input by a user (an operator) or the like through the input/output interface 80 by operating an input unit 77, the CPU 72 executes a program stored in a read only memory (ROM) 73 accordingly. Furthermore, the CPU 72 loads a program stored in a hard disk 75 into a random access memory (RAM) 74 and executes it.

The CPU 72 performs various processing to make the cloud server 30 function as a device having a predetermined function. For example, the CPU 72 causes a processing result of the various processing to be output from an output unit 76, transmitted from a communication unit 78, or recorded on the hard disk 75 via the input/output interface 80, if necessary.

The input unit 77 includes a keyboard, a mouse, a microphone, and the like. The output unit 76 includes an LCD, a speaker, and the like.

The program executed by the CPU 72 can be recorded in advance on the hard disk 75, the ROM 73, and a removable recording medium 81 as recording media built in the cloud server 30.

Figure 6:
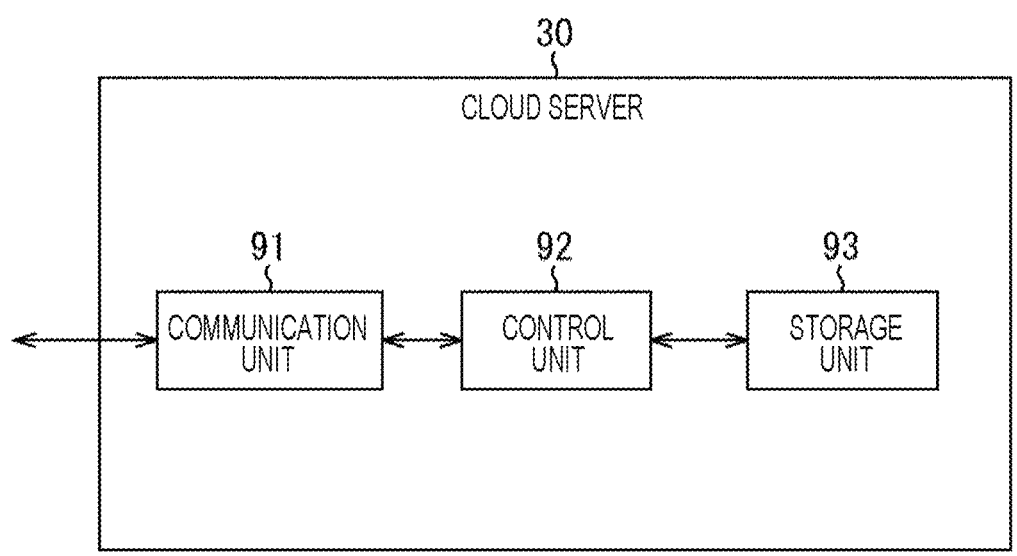
FIG. 6 is a block diagram showing a function configuration example of the cloud server.

FIG. 6 is a block diagram showing a functional configuration example of the cloud server 30.

As shown in FIG. 6, the cloud server 30 includes a communication unit 91, a control unit 92, and a storage unit 93.

The communication unit 91 corresponds to the communication unit 78 of FIG. 5, and performs wireless or wired communication with the moving body 20. For example, the communication unit 91 receives transmission data such as a captured image transmitted on the basis of the priority set in the moving body 20.

The control unit 92 corresponds to the CPU 72, ROM 73, and RAM 74 of FIG. 5 and controls the communication unit 91 and the storage unit 93. The control unit 92 performs processing using data received by the communication unit 91 and data stored in the storage unit 93.

The storage unit 93 corresponds to, for example, the hard disk 75 of FIG. 5 and stores (houses) various data such as the captured image transmitted from the moving body 20.

<4. Flow of Data Transmission Processing>

Figure 7:
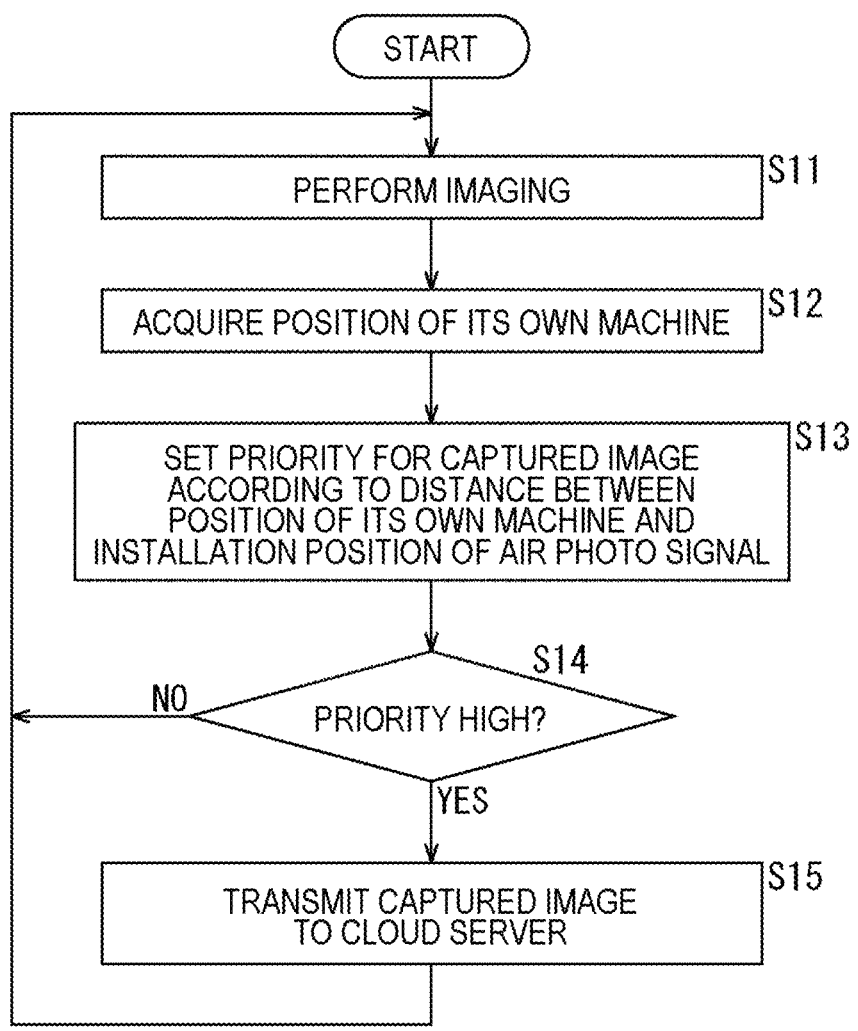
FIG. 7 is a flowchart illustrating a flow of data transmission processing.

Next, a flow of data transmission processing by the moving body 20 of FIG. 4 will be described with reference to a flowchart of FIG. 7. The processing in FIG. 7 is executed after, for example, the moving body 20 starts flying along a movement route (flight route) in which a plurality of air photo signals 10 is installed according to operation of the controller 42.

In step S11, the camera 21 mounted on the moving body 20 in flight performs imaging on the ground (aerial imaging). A captured image acquired by the imaging of the camera 21 is supplied to the control unit 52.

In step S12, the communication unit 51 acquires a position of its own machine by receiving GPS information transmitted from the GPS satellite 40 at imaging timing of the camera 21.

In step S13, the control unit 52 sets a priority for the captured image according to a distance between the position of its own machine acquired by the communication unit 51 and an installation position of the air photo signal 10 stored in the storage unit 55.

Here, the priority set for the captured image will be described with reference to FIG. 8.

As shown in FIG. 8, in a case where the acquired captured image is a captured image captured near the air photo signal 10, that is, in a case where the distance between the position of its own machine and the installation position of the air photo signal 10 is short, the priority is set to "high".

On the other hand, in a case where the acquired captured image is the other captured image that is not the captured image captured near the air photo signal 10, that is, in a case where the distance between the position of its own machine and the installation position of the air photo signal 10 is long, the priority is set to "low".

As described above, in the example of FIG. 8, either "high" or "low" priority is set for the captured image.

Returning to the flowchart of FIG. 7, in step S14, the control unit 52 determines whether or not the priority set for the captured image is high ("high").

In a case where it is determined in step S14 that the priority is "high", in step S15, the control unit 52 controls the communication unit 51 to transmit the captured image to the cloud server 30.

After the captured image is transmitted to the cloud server 30 in step S15, the process returns to step S11, and similar processing is repeated at regular time intervals. Furthermore, in a case where it is determined in step S14 that the priority is "low", the captured image is not transmitted, the process returns to step S11, and the similar processing is repeated at regular time intervals.

As described above, the moving body 20 captures an aerial image of the ground at a cycle of, for example, every few minutes while flying along the flight route, and transmits the captured image to the cloud server 30 on the basis of the priority set for the acquired captured image.

Note that the captured images with the priority set to "low" may be stored in the storage unit 55 and the like, and collectively transmitted to the cloud server 30 by wired communication, for example, after the flight is completed.

Furthermore, the captured images with the priority set to "high" may be accumulated in a transmission buffer of the control unit 52, and collectively transmitted to the cloud server 30 when a certain amount of captured images are accumulated.

According to the above processing, it is possible to preferentially transmit a captured image with a high possibility of showing the air photo signal 10, that is, to preferentially transmit necessary data. Therefore, even in a case where a communication band between the moving body 20 and the cloud server 30 is narrow, a topographical survey result can be output with less delay.

In the above, it is assumed that the captured image itself with the priority set to "high" is transmitted to the cloud server 30. However, an identifier of the captured image with the priority set to "high" may be transmitted to the cloud server 30. The captured images themselves with the priority set to "high" are stored in the storage unit 55 and the like, and are collectively transmitted to the cloud server 30 after the flight is completed.

The identifier of the captured image may be any information that can specify the captured image, and is, for example, a file name of the captured image, a separately assigned ID, or the like.

In this case, the identifier of the captured image is associated with the position of its own machine (GPS information) when the captured image has been acquired, and the priority is set for the identifier of the captured image according to a distance between the position of the GPS information and the installation position of the air photo signal 10.

Furthermore, by configuring the camera 21 as a GPS camera, the GPS information at the time when the captured image has been acquired may be stored in exchangeable image file format (Exif) information included in the captured image. In this case, the priority may be set for the captured image according to the distance between the position of the GPS information and the installation position of the air photo signal 10.

Here, with reference to FIG. 9, the priority set for the captured image and its identifier will be described.

As shown in FIG. 9, in a case where the position of the GPS information associated with the identifier of the acquired captured image is near the installation position of the air photo signal 10, the priority for the identifier of the captured image is set to "high".

Furthermore, in a case where the position of the GPS information associated with the identifier of the acquired captured image is far from the installation position of the air photo signal 10, the priority for the identifier of the captured image is set to "low".

In this way, in a case where the identifier of the captured image is transmitted, an amount of data transmitted to the cloud server 30 is smaller than a case where the captured image itself is transmitted.

On the other hand, in a case where the position of the GPS information stored in the Exif information is near the installation position of the air photo signal 10, the priority for the captured image is set to "high".

Furthermore, in a case where the position of the GPS information stored in the Exif information is far from the preset installation position of the air photo signal 10, the priority for the captured image is set to "low".

In this way, in a case where the captured image itself is transmitted, an amount of data transmitted to the cloud server 30 is larger than a case where the identifier of the captured image is transmitted.

In the example of FIG. 9, in a case where both the identifier with the small amount of data and the captured image with the large amount of data are transmitted according to the priority, the data with the small amount of data may be preferentially transmitted even if the priority is the same.

As described above, the priority can be set for the identifier of the captured image and the captured image itself according to the distance between the position of the GPS information associated with the identifier of the captured image or the GPS information included in the captured image and the installation position of the air photo signal 10.

<5. Example of Analyzing Captured Image>

In the following, description will be given of an example in which the moving body 20 analyzes a captured image acquired by imaging of the camera 21 and determines whether or not the air photo signal 10 appears in the captured image, so that the captured image with the air photo signal 10 is transmitted more reliably.

(Configuration of Drone)

Figure 10:
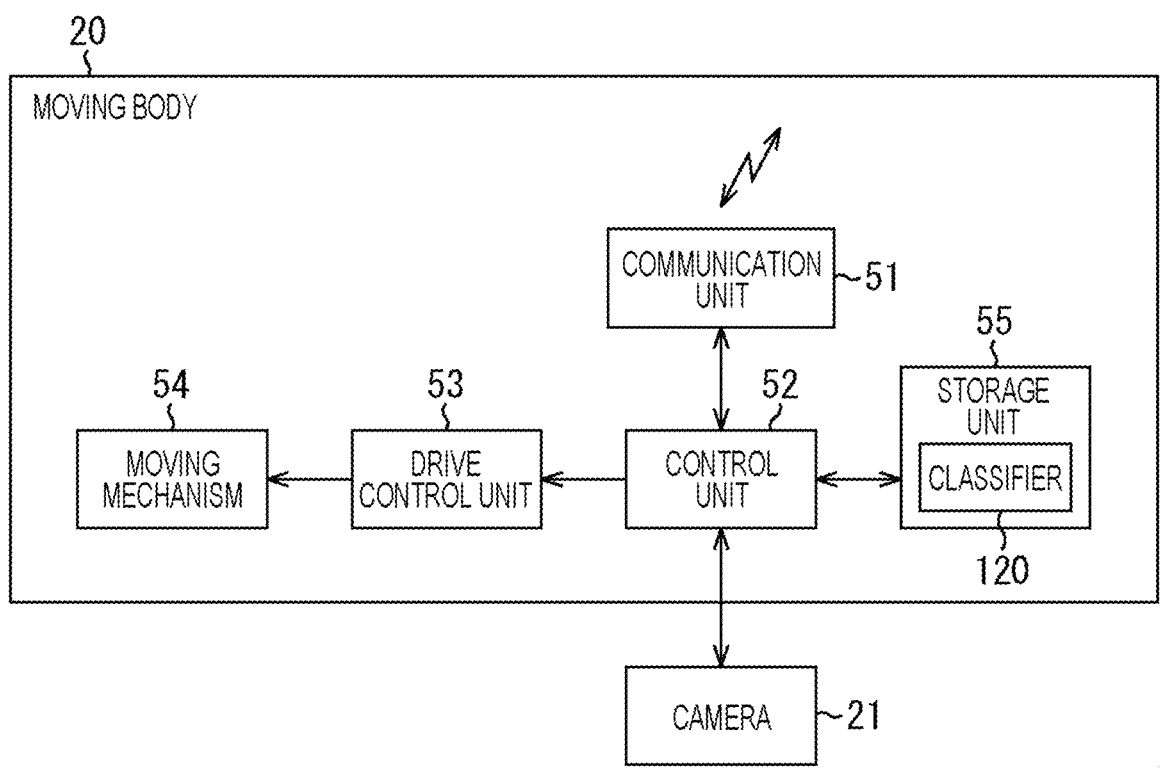
FIG. 10 is a block diagram showing another configuration example of the moving body.

FIG. 10 is a block diagram showing another configuration example of the moving body 20.

The moving body 20 of FIG. 10 is basically configured in a manner similar to the moving body 20 of FIG. 4, but is different from the moving body 20 of FIG. 4 in that a classifier 120 is stored (held) in the storage unit 55.

The control unit 52 uses the classifier 120 held in the storage unit 55 to analyze a captured image acquired by imaging of the camera 21. Furthermore, the control unit 52 sets a priority for the captured image and an analysis result of the captured image.

An algorithm that constitutes the classifier 120 and parameters such as a threshold value and the number of repetitions in the algorithm are preset for each flight purpose such as a topography survey and structure inspection and each flight environment of the moving body 20.

The communication unit 51 transmits at least one of the captured image or the analysis result to the cloud server 30 on the basis of the set priority.

(Data Transmission Processing)

Next, a flow of data transmission processing by the moving body 20 of FIG. 10 will be described with reference to a flowchart of FIG. 11.

Figure 11:
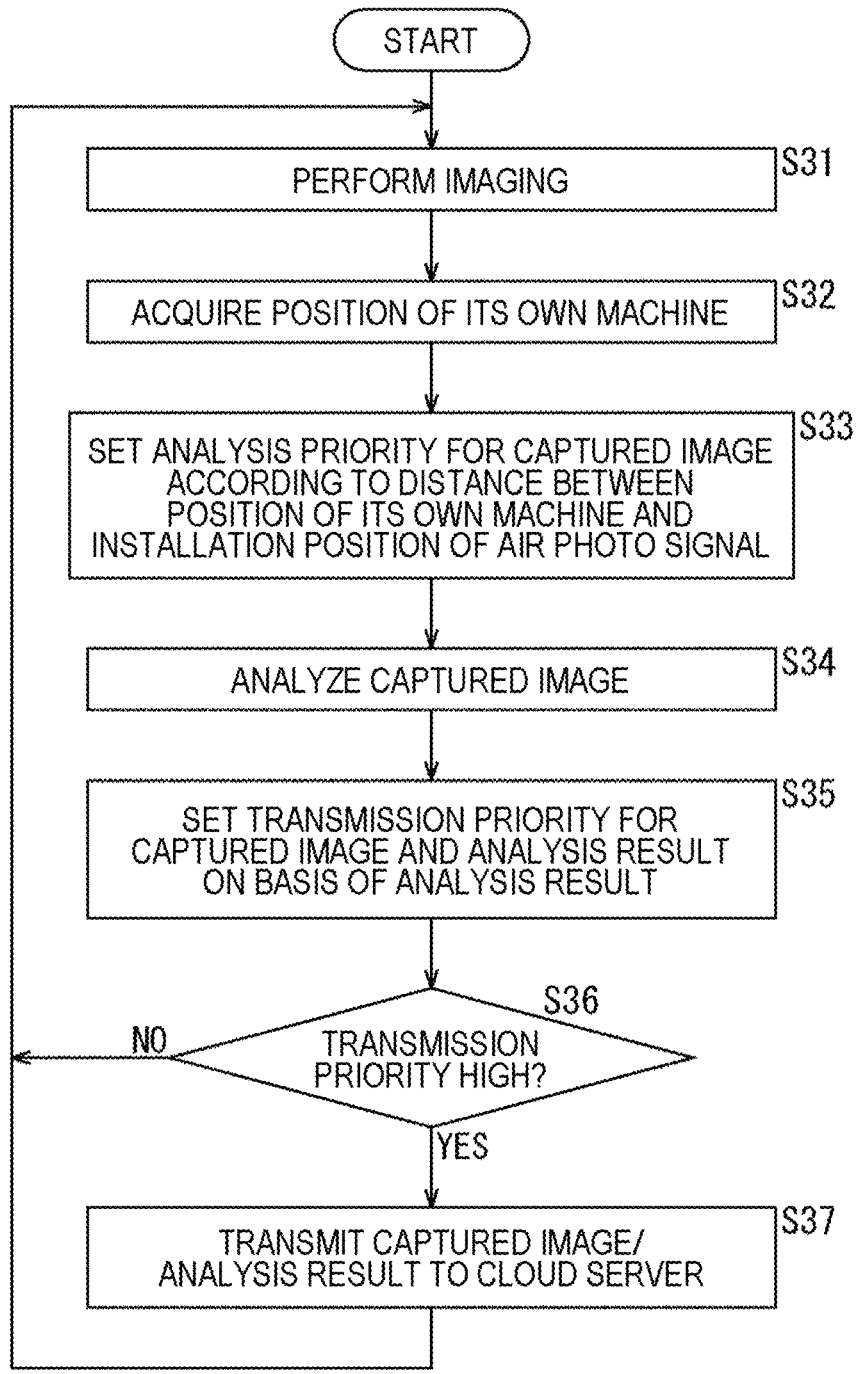
FIG. 11 is a flowchart illustrating a flow of data transmission processing.

Note that since processing of steps S31 and S32 in the flowchart of FIG. 11 is similar to the processing of steps S11 and S12 in the flowchart of FIG. 7, description thereof will be omitted.

In step S33, the control unit 52 sets an analysis priority for a captured image according to a distance between a position of its own machine acquired by the communication unit 51 and an installation position of the air photo signal 10 stored in the storage unit 55.

The analysis priority is a priority of the analysis of the captured image, and the captured image for which a high priority is set is preferentially analyzed. In other words, a captured image with a high possibility of showing the air photo signal 10 is preferentially analyzed.

In step S34, the control unit 52 analyzes the captured image on the basis of the priority set for the captured image. Specifically, the control unit 52 uses the classifier 120 held in the storage unit 55 to identify a subject corresponding to a specific position (installation position of the air photo signal 10) in the captured image, that is, the air photo signal 10.

Here, as an analysis result (identification result) of the captured image, for example, it is possible to obtain presence or absence of the subject (air photo signal 10), position information (coordinate position) of the subject (air photo signal 10), an identifier of the analyzed captured image, certainty that an identification target is the subject (air photo signal 10), and the like.

When the analysis of the captured image is completed, the process proceeds to step S35, and the control unit 52 sets a transmission priority for the captured image and the analysis result.

The transmission priority is a priority of transmission to the cloud server 30, and the captured image or analysis result for which a high priority is set is preferentially transmitted to the cloud server 30.

Here, the transmission priority set for the captured image and the analysis result will be described with reference to FIG. 12. In this example, the priority is set higher as an amount of data is smaller.

In other words, the priority for an analysis result with a small amount of data (identifier of the analyzed captured image, position information of the air photo signal 10, and the like) is set to "high".

Note that the priority may be individually set for each of the presence or absence of the air photo signal 10, the position information of the air photo signal 10, the identifier of the analyzed captured image, and the certainty of the identification target obtained as the analysis result of the captured image.

On the other hand, among the captured images themselves having an amount of data larger than the analysis result, the priority for the captured image with the air photo signal 10 is set to "medium", and the priority for the captured image without the air photo signal 10 is set to "low".

Here, by cutting out an area including the air photo signal 10 from the captured image with the air photo signal 10, an amount of data can be kept to a medium level. In this case, the priority for an image obtained by cutting out the area including the air photo signal 10 is set to, for example, "medium".

As described above, in the example of FIG. 12, one of "high", "medium", and "low" priority is set for the captured image.

Returning to the flowchart of FIG. 11, in step S36, the control unit 52 determines whether or not the priority set for the captured image and the analysis result is high ("high").

In a case where the priority is determined to be "high" in step S36, the control unit 52 controls the communication unit 51 to transmit the captured image or the analysis result to the cloud server 30 in step S37.

After the captured image or the analysis result is transmitted to the cloud server 30 in step S37, the process returns to step S31, and similar processing is repeated at regular time intervals. Furthermore, in a case where the priority is determined to be "medium" or "low" in step S36, the captured image is not transmitted, the process returns to step S31, and the similar processing is repeated at regular time intervals.

As described above, the moving body 20 captures an aerial image of the ground at a cycle of, for example, every few minutes while flying along the flight route, and transmits the captured image or the analysis result to the cloud server 30 on the basis of the priority set for the acquired captured image and the analysis result.

Note that the captured images with the priority set to "medium" or "low" are stored in the storage unit 55 and the like, and are collectively transmitted to the cloud server 30 by wired communication, for example, after the flight is completed.

Furthermore, the analysis results with the priority set to "high" may be accumulated in the transmission buffer of the control unit 52, and collectively transmitted to the cloud server 30 when a certain amount of analysis results are accumulated.

According to the above processing, it is possible to preferentially transmit an analysis result of a captured image with a high possibility of showing the air photo signal 10, that is, to preferentially transmit necessary data. Therefore, even in a case where a communication band between the moving body 20 and the cloud server 30 is narrow, a topographical survey result can be output with less delay.

<6. Examples of Identification Target and Analysis Result for Each Flight Purpose>

In the above, a flight purpose of the moving body 20 is to survey the topography, but it may be to inspect a structure. Structure inspection includes, for example, detection of a crack and tile peeling on an outer wall of a building such as a building installed on the ground, and detection of damage to a solar panel.

FIG. 13 is a diagram illustrating an example of an identification target and an analysis result in analysis of a captured image for each flight purpose.

In a case where the flight purpose is to survey topography, as shown in an upper part of FIG. 13, the identification target (subject) in the analysis of the captured image is the air photo signal 10, as described above. Furthermore, the analysis result is position information of the air photo signal 10 or the like.

In a case where the flight purpose is to detect a crack or tile peeling on an outer wall of a building, as shown in a middle part of FIG. 13, the identification target in the analysis of the captured image is the crack or tile peeling on the outer wall. Furthermore, the analysis result is detection information indicating a cracked portion or a tile peeled portion on the outer wall.

In a case where the flight purpose is to detect damage to a solar panel, as shown in a lower part of FIG. 13, the identification target in the analysis of the captured image is the damage to the solar panel. Furthermore, the analysis result is detection information indicating a damaged portion of the solar panel.

In this way, in a case where the flight purpose of the moving body 20 is to inspect the structure, it is possible to preferentially transmit an analysis result of a captured image with a high possibility of showing an inspection target portion of the structure serving as the identification target, that is, to preferentially transmit necessary data. Therefore, even in a case where a communication band between the moving body 20 and the cloud server 30 is narrow, an inspection result of the structure can be output with less delay.

In the configuration of FIG. 10, the moving body 20 analyzes the captured image and transmits the analysis result to the cloud server 30, but the cloud server 30 may analyze the captured image transmitted from the moving body 20.

<7. Operation of Cloud Server>

Figure 14:
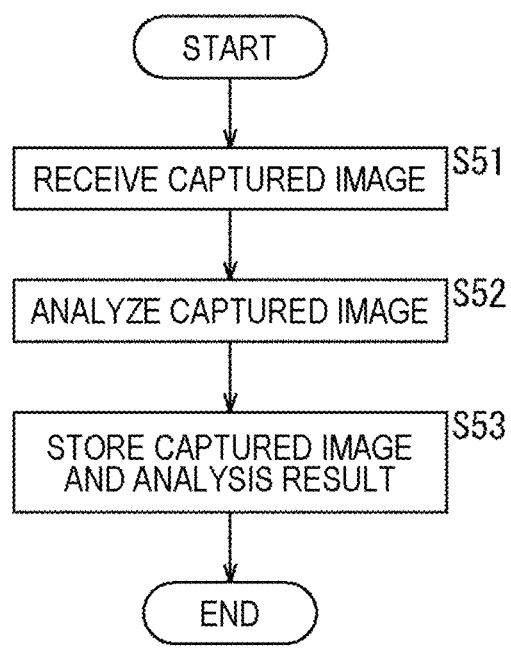
FIG. 14 is a flowchart illustrating operation of the cloud server.

Here, operation of the cloud server 30 in a case where the cloud server 30 analyzes a captured image will be described with reference to a flowchart of FIG. 14. In this case, it is assumed that the classifier 120 is held in the storage unit 93 of the cloud server 30.

In step S51, the communication unit 91 receives a captured image from the moving body 20. This captured image is, for example, a captured image with a high possibility of showing the air photo signal 10.

In step S52, the control unit 92 analyzes the captured image from the moving body 20. Specifically, the control unit 92 identifies the air photo signal 10 in the captured image by using the classifier 120 held in the storage unit 93.

In step S53, the control unit 92 stores the captured image from the moving body 20 and an analysis result thereof in the storage unit 93.

The analysis result stored in the storage unit 93 is used to create a three-dimensional model of topography on the ground. The cloud server 30 surveys the topography on the ground from the created three-dimensional model, and outputs a result of the survey via the communication unit 91.

<8. Others>

Modified Examples

In a configuration in which a priority is set for a captured image and its analysis result, in a case where a priority higher than that of the captured image being transmitted is set for the analysis result during transmission of the captured image, the communication unit 51 may interrupt and transmit the analysis result. Therefore, it is possible to more reliably transmit necessary data preferentially.

Furthermore, in a case where an amount of untransmitted data accumulated in the transmission buffer exceeds a predetermined amount (for example, in a case where the transmission buffer overflows) when a communication band is narrow and the like, the communication unit 51 may not transmit the untransmitted data.

Moreover, in the above, it is assumed that two patterns of "high" and "low" or three patterns of "high", "medium", and "low" are set as the priorities. Not limited to this, more detailed priorities may be given to data having the same priority (captured images and analysis results).

Specifically, for a plurality of data for which the same priority is set, for example, a high priority is given from a captured image with a small amount of data, or a high priority is given from an analysis result with high certainty of an identification target.

In this case, the communication unit 51 may not transmit data having a priority lower than a predetermined order.

The series of processing described above can be executed by hardware or software. In a case where the series of processing is executed by the software, a program constituting the software is installed from a network or a program recording medium.

Note that an embodiment of the technology according to the present disclosure is not limited to the above-described embodiment, and various modifications can be made without departing from the scope of the technology according to the present disclosure.

Furthermore, the effects described in the present specification are merely examples and are not limited, and there may be other effects.

Moreover, the technology according to the present disclosure can have the following configurations.

(1)
A moving body including:
a control unit that sets a processing priority for data acquired by its own machine; and
a communication unit that transmits the data on the basis of the set priority.

(2)
The moving body according to (1), in which
the control unit sets the priority for the data on the basis of a position of its own machine when the data has been acquired and context information regarding a movement route.

(3)
The moving body according to (2), in which
the context information regarding the movement route includes a specific position preset on the movement route.

(4)
The moving body according to (3), further including:
a camera that performs imaging during movement, in which
the data to be transmitted includes a captured image acquired by imaging with the camera.

(5)
The moving body according to (4), in which
the control unit sets the priority for the captured image according to a distance between the position of its own machine when the captured image has been acquired and the specific position, and
the communication unit transmits the captured image on the basis of the set priority.

(6)
The moving body according to (4), in which
the control unit sets the priority for an identifier of the captured image according to a distance between a position indicated by position information associated with the identifier and the specific position, and
the communication unit transmits the identifier on the basis of the set priority.

(7)
The moving body according to (4), in which
the control unit sets the priority for the captured image according to a distance between a position indicated by position information included in the captured image and the specific position, and
the communication unit transmits the captured image on the basis of the set priority.

(8)
The moving body according to (4), in which
the control unit
analyzes the captured image on the basis of a first priority set for the captured image, and
sets a second priority for the captured image and an analysis result of the captured image, and the communication unit transmits at least one of the captured image or the analysis result on the basis of the set second priority.

(9)
The moving body according to (8), in which
the control unit identifies a subject corresponding to the specific position in the captured image.

(10)
The moving body according to (9), in which
the analysis result includes presence or absence of the subject.

(11)
The moving body according to (9) or (10), in which
the analysis result includes position information of the subject.

(12)
The moving body according to any one of (9) to (11), in which
the analysis result includes an identifier of the analyzed captured image.

(13)
The moving body according to any one of (9) to (12), in which
the analysis result includes certainty that an identification target is the subject.

(14)
The moving body according to any one of (9) to (13), in which
the subject is an air photo signal used to survey topography.

(15)
The moving body according to any one of (9) to (13), in which
the subject is an inspection target portion of a structure.

(16)
The moving body according to any one of (4) to (15), in which
the camera performs imaging at regular time intervals, and
the control unit sets the priority for the data acquired at the regular time intervals.

(17)
The moving body according to any one of (1) to (16), in which
in a case where the priority higher than that of first data is set for second data during transmission of the first data, the communication unit interrupts and transmits the second data.

(18)
The moving body according to any one of (1) to (17), in which
in a case where an amount of the untransmitted data accumulated in a transmission buffer exceeds a predetermined amount, the communication unit does not transmit the untransmitted data.

(19)
A communication method, in which
a moving body
sets a processing priority for data acquired by its own machine, and
transmits the data on the basis of the set priority.

(20)
A program for allowing a computer to execute processing of:
setting a processing priority for data acquired by a moving body; and
transmitting the data on the basis of the set priority.

REFERENCE SIGNS LIST

1 Moving body
10 Air photo signal
20 Moving body
21 Camera
30 Cloud server
51 Communication unit
52 Control unit
53 Drive control unit
54 Moving mechanism
55 Storage unit
91 Communication unit
92 Control unit
93 Storage unit
120 Classifier

The invention claimed is:
1. A moving body comprising:
a circuit that sets a processing priority for data acquired by its own machine;
a camera that performs imaging during movement of the moving body; and
a communicator that transmits the data on a basis of the set priority, wherein
the data to be transmitted includes a captured image acquired by imaging with the camera, the captured image including an air photo signal,
the moving body is a drone configured to fly,
the circuit sets the processing priority for the data based on:
a distance between the moving body and the air photo signal, and
context information regarding a movement route, and
the circuit sets the processing priority to high in response to the distance between the moving body and the air photo signal being below a predetermined distance and sets the procession priority to low when the distance between the moving body and the air photo signal is greater than the predetermined distance.

2. The moving body according to claim 1, wherein
the context information regarding the movement route includes a specific position preset on the movement route.

3. The moving body according to claim 2, wherein
the communicator transmits the captured image on a basis of the set processing priority.

4. The moving body according to claim 1, wherein
the air photo signal is used to survey topography.

5. The moving body according to claim 2, wherein
the camera performs imaging at regular time intervals, and
the circuit sets the processing priority for the data acquired at the regular time intervals.

6. The moving body according to claim 1, wherein
in a case where an amount of untransmitted data accumulated in a transmission buffer exceeds a predetermined amount, the communicator does not transmit the untransmitted data.

7. The moving body according to claim 1, wherein the air photo signal includes a predetermined figure or a predetermined shape.

8. The communication method of claim 7, wherein
the camera captures images at regular time intervals, and
the circuit sets the processing priority for the data acquired at the regular time intervals.

9. A communication method, the method comprising:
providing a moving body, the moving body being a drone and including:
- a circuit;
- a camera; and
- a communicator, capturing, by the camera, an image, the captured image including an air photo signal, setting, by the circuit, processing priority for data acquired by the moving body based on:
- a distance between the moving body and the air photo signal, and
- context information regarding a movement route, wherein the circuit sets the processing priority to high in response to the distance between the moving body and the air photo signal being below a predetermined distance and sets the processing priority to low when the distance between the moving body and the air photo signal is greater than the predetermined distance; and transmitting, by the communicator, the data on a basis of the set processing priority.

10. The communication method of claim 9, wherein the context information regarding the movement route includes a specific position preset on the movement route.

11. The communication method of claim 10, further comprising
transmitting, by the communicator, the captured image on a basis of the set processing priority.

12. The communication method of claim 9, further comprising
surveying topography using the air photo signal.

13. The communication method of claim 9, wherein
in a case where an amount of untransmitted data accumulated in a transmission buffer exceeds a predetermined amount, the communicator does not transmit the untransmitted data.

* * * * *